(No Model.) 3 Sheets—Sheet 1.
E. THOMSON.
THERMAL DEVICE FOR VARYING ELECTRIC RESISTANCES OR CURRENTS.
No. 389,265. Patented Sept. 11, 1888.
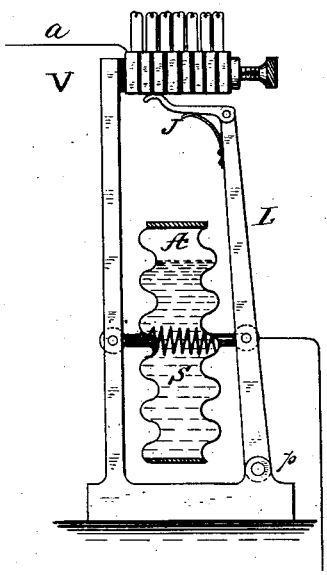
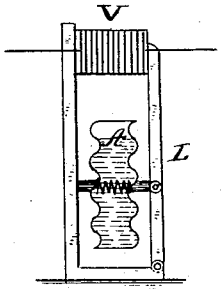
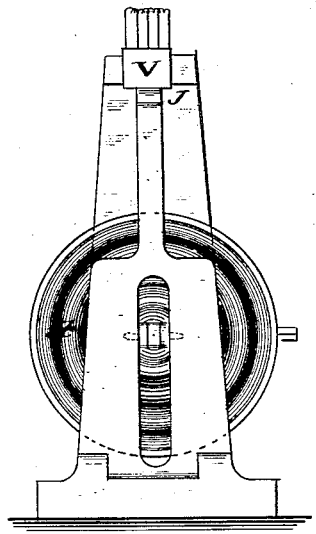
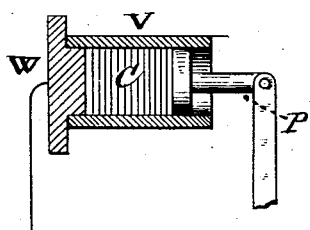
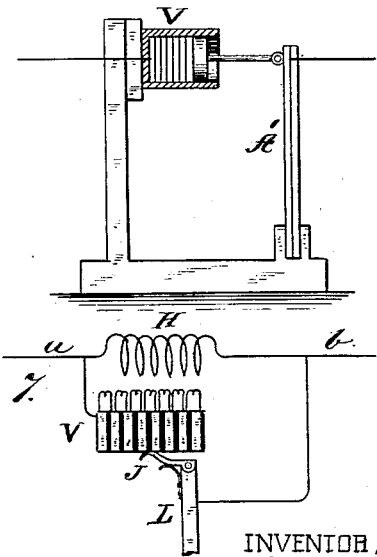
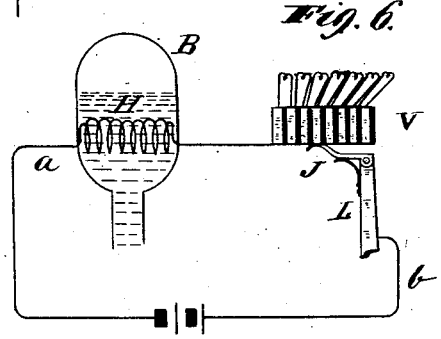
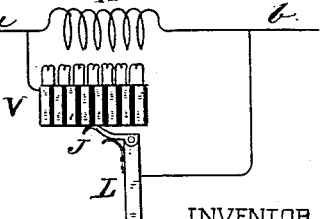
WITNESSES:
Gabriel J. W. Galster.
Wm H. Capel
INVENTOR,
Elihu Thomson.
BY Townsend & MacArthur
ATTORNEYS.

(No Model.) 3 Sheets—Sheet 2.
E. THOMSON.
THERMAL DEVICE FOR VARYING ELECTRIC RESISTANCES OR CURRENTS.
No. 389,265. Patented Sept. 11, 1888.
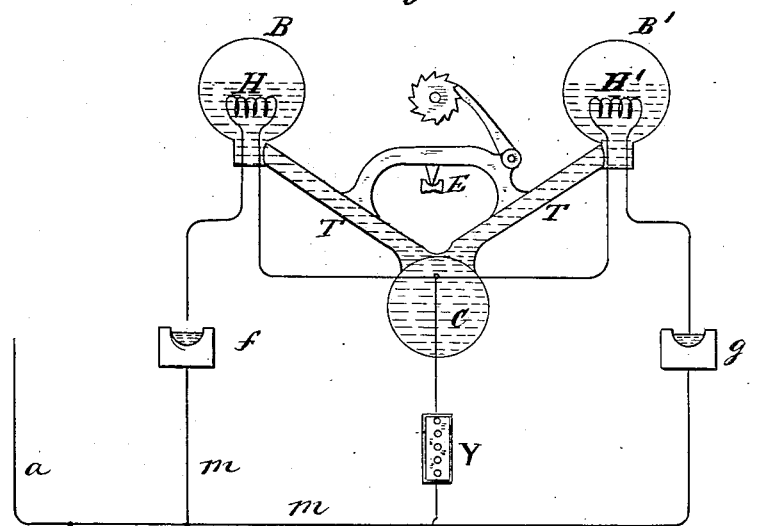
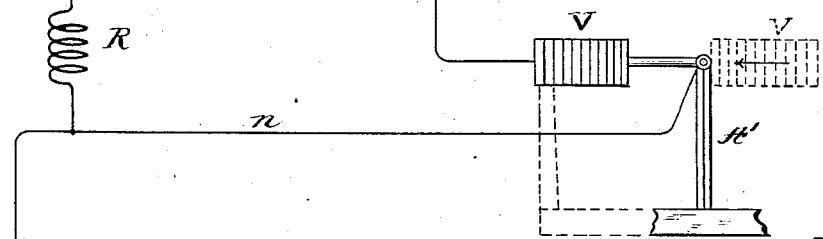
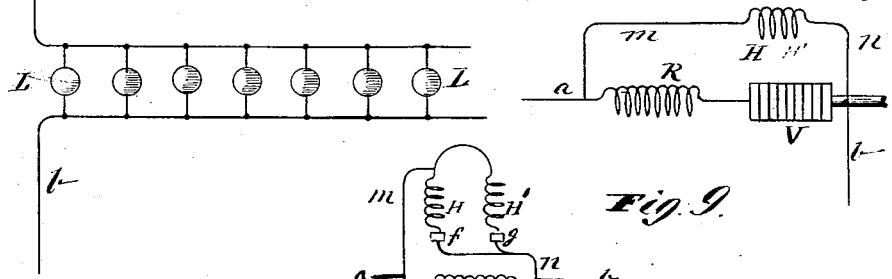
WITNESSES:
INVENTOR.
Elihu Thomson.
BY
ATTORNEYS.

(No Model.) 3 Sheets—Sheet 3.
E. THOMSON.
THERMAL DEVICE FOR VARYING ELECTRIC RESISTANCES OR CURRENTS.
No. 389,265. Patented Sept. 11, 1888.
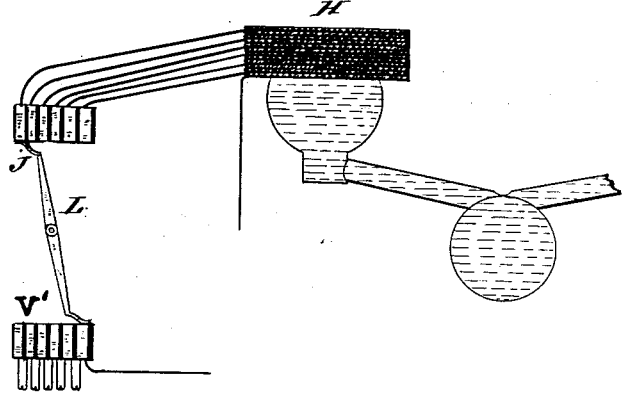
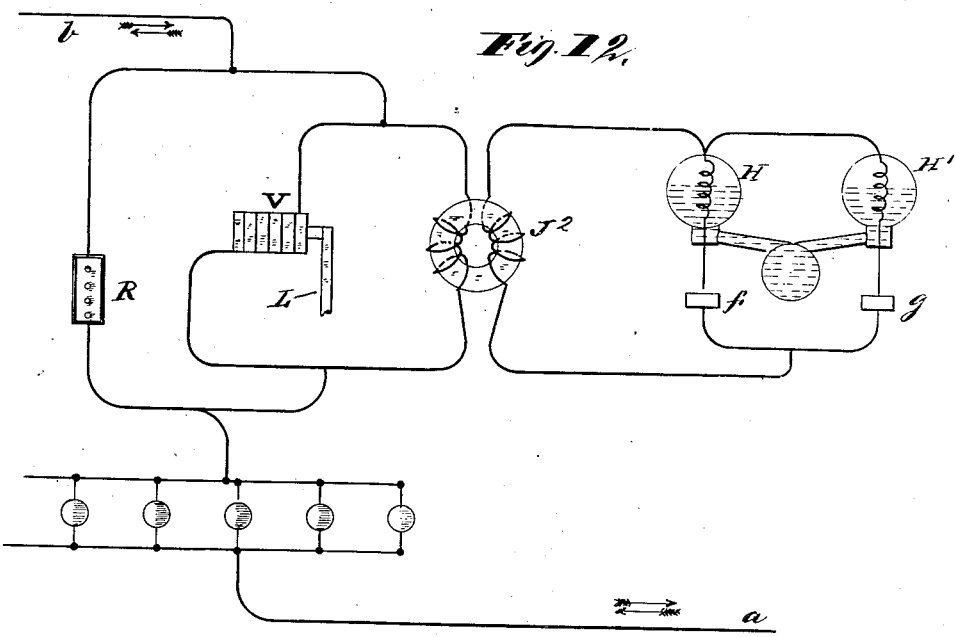
WITNESSES. INVENTOR.
Gabriel J. W. Galster. Elihu Thomson.
Wm H. Capel. BY
Townsend & MacArthur.
ATTORNEYS.

UNITED STATES PATENT OFFICE.

ELIHU THOMSON, OF LYNN, MASSACHUSETTS.

THERMAL DEVICE FOR VARYING ELECTRIC RESISTANCE OR CURRENTS.

SPECIFICATION forming part of Letters Patent No. 389,265, dated September 11, 1888.

Application filed December 31, 1887. Serial No. 259,447. (No model.)

*To all whom it may concern:*

Be it known that I, ELIHU THOMSON, a citizen of the United States, and a resident of Lynn, in the county of Essex and State of Massachusetts, have invented certain new and useful Improvements in Thermal Devices for Varying Electric Resistance or Currents, of which the following is a specification.

My invention consists in the combination, with an electro-thermo-dynamic device of any construction—such, for instance, as an electric meter—whose indications are produced through the application of heat developed by the electric current, of a thermo-dynamic actuator or controller responsive to variations of temperature in the atmosphere surrounding such meter or other dynamic device, and an electric regulator or controller adjustable in correspondence with the variations of temperature for the purpose of governing the flow of current to the thermo-dynamic device and compensating for the variations of temperature in the surrounding air.

The regulator or controller may be, for instance, a variable resistance of any desired character suitable for adjustment, and consisting, for instance, of contacts of carbon or other material between which a variable intensity of contact may be produced, a series of carbon blocks, disks, or pieces that may be pressed together by a series of contact blocks or pieces connected to different points of an artificial resistance—such, for instance, as a considerable length of fine wire.

The thermo-dynamic actuator may be any thermo device responsive to changes of temperature—such, for instance, as a compound bar formed of two materials having different rates of expansion—or may consist of a closed chamber having a flexible side or sides and containing a vaporizable fluid, preferably *in vacuo*. Any device, however, in which power will be developed by the application of heat in a similar manner will serve the purpose of my invention. In combination with the electro-thermo-dynamic device, and as a compensator for variations of external temperature, I may, however, use in place of the variable resistance any electric regulator or controller which will govern the flow of current to the thermo-dynamic devices, such electric regulator or controller being operated or governed by the thermo-dynamic actuator in the same manner as the variable resistance. Thus, for instance, in place of the electric resistance placed in or connected to the circuit of the thermo-dynamic device, I might use a means which would vary the amount of heating conductor of the thermo-dynamic device, or, instead of applying the adjustable resistance to the direct circuit of the thermo-dynamic device, it might be applied in the primary circuit of an induction-coil, the secondary of which would deliver the current used for heating the thermo-dynamic device. Still other variations might be used in the manner of regulating or controlling the current affecting the thermo-dynamic device, as will be well understood by skilled electricians.

In the accompanying drawings, Figure 1 is a side elevation of a compound thermo-dynamic actuator and variable resistance. Fig. 2 is an end view of the same. Fig. 3 represents a modification of the compound thermo-dynamic actuator and variable resistance. Fig. 4 shows a variation in the form of the resistance. Fig. 5 shows a variation in the form of the thermo-dynamic actuator or controller. Fig. 6 shows the application of my invention to a circuit, including a coil, H, in which it is desired to vary or control the amount of current in accordance with variations of temperature. Fig. 7 shows a modification in the manner of connecting the variable resistance to the circuit in which the flow of current is to be varied, the thermo-dynamic actuator or controller for the variable resistance being omitted. Fig. 8 illustrates the use of my invention in combination with an electro-thermo-dynamic device in the manner invented by me to effect a compensation for the changes of temperature in the atmosphere surrounding said device. Figs. 9 and 10 represent different circuit arrangements of the variable resistance and the electro-thermo-dynamic device. Fig. 11 illustrates a modification of the invention illustrated by Fig. 8, the electric regulator or controller, which in Fig. 8 consists of a variable resistance, being in Fig. 11 replaced by an electric switch adapted to vary the amount of heating-conductor which shall be in connection in the electro-thermo-dynamic device. Fig. 12 illustrates another modification in the manner of regulating or controlling the flow of current to the electro-thermo-dynamic device in accordance with the variations of external temperature.

Referring to Figs. 1 and 2, A indicates a box or case having thin metal sides corrugated in a similar manner to an aneroid barometer. The two sides of the box are held apart by a spring, S, and a lever, L, pivoted at $p$, is arranged to bear upon or is connected with a moveable side of the box, so that on movement of the side the lever will be actuated, thereby moving a contact-spring, J, over a series of contacts of a variable resistance, the contacts of which are indicated at V. The box A contains ether, alcohol, or other volatile fluid, which is boiled and sealed in the box while vapor is escaping; or a vacuum may be produced in the box by exhausting the air or vapor by means of a pump and then sealing or soldering, the operation being similar to that which is resorted to in the manufacture of (aneroid) boxes. On change of temperature affecting the box A the side of the same expands and moves the lever L, thus producing a variation in the resistance formed by the coils or sections of conductor connected in regular order to the contact-blocks at V in well-known manner.

It is obvious that the parts might be arranged so that either an increase or a decrease of resistance would be produced by the increase of temperature affecting the thermo-dynamic actuator consisting of the box A, having the expansible or movable sides.

It is obvious, further, that the movement obtained by the expansion of the inclosed liquid or vapor in the box A might be made to move the contact or spring J by any other mechanical means. It is preferable, however, to employ the lever, in order to get greater range of movement and greater sensitiveness.

In Fig. 3 the variable resistance is shown as consisting of a series of plates of carbon, V, laid upon one another, and subject to compression by the operation of a lever, L, which is connected with the thermo-dynamic actuator A in such manner that on a decrease of temperature and contraction of the latter the lever will operate to compress the box and decrease the resistance. In this arrangement it is obvious that an expansion of the thermo-dynamic actuator or adjuster on an increase of temperature will increase the resistance as before.

The variable resistance is supposed to be in an electric circuit from $a$ to $b$, Fig. 1, in obvious manner, such circuit including the movable contact-spring and lever L, as indicated in Fig. 1.

In Fig. 4 laminæ of carbon—such as are obtained by carbonizing tarred paper—are supposed to be included in a tube of glass or like material. The mass of variable-resistance material, here consisting of the laminæ or of any other form of carbon or metal pieces, is included between a conducting-plate, W, closing one end of the tube of glass, and a movable piston or plate, P, which is subject to the action of the thermo-dynamic actuator A or its equivalent.

In Fig. 5 the thermo-dynamic actuator which through the variations of temperature actuated the variable resistance is shown as consisting of a compound bar composed of two pieces of metal or material—as, for instance, brass and iron or hard rubber and iron—which are secured together. Owing to the difference in the coefficients of expansion of the two materials a change of temperature would cause the compound bar to bend. This form of thermo-dynamic actuator may be substituted for that shown in Fig. 1 in obvious manner. Other forms of thermo-dynamic device which change their form or dimensions, or which expand under the operation of heat, might be employed in place of those described. It is likewise obvious that the parts might be arranged to increase or decrease the electrical resistance on a change of temperature in either direction.

In Fig. 6 the application of my invention to changing the flow of current in a coil at H on variations of temperature is illustrated. The coil H and the variable resistance are placed in a circuit from $a$ to $b$ and are supplied with current from any source. The variable resistance is operated by the lever L, as before, on a change of temperature.

In Fig. 6 the coil H or other device, the flow of current to which is to be governed or regulated, is shown as in direct circuit with the variable resistance; but the same effect might obviously be produced by properly arranging the variable resistance in a branch around the coil H or portion of circuit represented by coil H, so as to vary the current by variably shunting the same, as indicated in Fig. 7.

In Fig. 8 I have illustrated one of the ways in which my invention may be utilized in a novel manner for compensating for changes of external temperature, which would otherwise produce a disturbing effect in the operation of a thermo-dynamic device which is operated or controlled by means of the heat developed by an electric current. The form of electro-thermo-dynamic device which I have here illustrated consists of a bulb or receptacle, B or B', of glass, containing a volatile, vaporizable, or expansible liquid, which bulb or receptacle is here shown as used in connection with suitable devices to perform the functions of an electric meter, according to a previous invention of my own.

In an electric meter, with alcohol or ether or other liquid used as the heated medium, it is desirable that there should be some compensation for changes of external temperature, which changes will obviously tend to affect the accuracy of the registration.

The meter here shown consists of two bulbs, B B', connected by a tube, T, having preferably an intermediate bulb, C, as indicated, the bulbs and connecting-tubes being partially filled with alcohol or other vaporizable, expansible, or volatile liquid, as indicated. These bulbs contain sections of coils of electric conductor H H', which are alternately put into the circuit connected with or carrying the current to be measured by means of wires or connectors dipping alternately into cups $f$ $g$, containing mercury. The structure is swung upon a suitable pivot at E, as indicated, and connects with a register, so that the number of its oscillations will be counted.

In the present case the meter is shown applied to measuring the flow of current to a group of lamps, L, or other translating devices, the meter being placed in a branch of the circuit including wires $a$ and $b$, which branch is taken from opposite sides of an artificial electric resistance, R, employed for shunting or forcing a part of the current into the electric meter. The branch including the meter is subdivided into the two sub-branches $m$ $m$, which pass, respectively, to the two contacts and the two bulbs.

Included in the branch $m$ $m$, containing the meter, is placed the variable resistance V, which operates to regulate or govern the flow of current through the electro-thermo-dynamic device composed of the movable parts of the meter. This resistance is controlled by the thermo-dynamic actuator or regulator operating upon said resistance in the manner before explained and placed near to or in the meter-case, so as to be subject to the same external temperature as the bulbs. The resistance R is of moderate amount and may be traversed by the bulk of the current going to the lamps.

If alcohol be used in the bulbs of the meter, the operation of the meter will be affected by changes of external temperature and the meter will not register enough when very cold. At a higher temperature it will give greater indications for the same flow of electric current through the bulbs. If, however, the thermo-dynamic actuator operating on the resistance V be applied so as to lessen the resistance when the temperature falls, it will be obvious that more current will pass through the coils H H' as the apparatus cools in accord with the changes of temperature of the surrounding air, and that when the temperature rises the reverse will take place, owing to the automatic change produced in the regulator or compensator V by means of the thermo-dynamic actuator A'. If the liquid used in the bulbs be ether, a larger registry will be obtained with a low than with a high external temperature, and a compensation in the other direction will be required. In this case the artificial variable resistance would simply be placed on the other side of the compensating bar A', as indicated by the dotted lines, Fig. 8. If the thermo-dynamic actuator consisting of the vapor-tension box A, Fig. 1, be employed, a proper adjustment of the variations of resistance V required for any change in the meter registration can be obtained by suitably adjusting the leverage, or the adjustment may be obtained by varying the relation of resistance in the heating-coils to that in the resistance V by proper original construction, or by varying the actual amount of resistance in the meter branch itself outside of that of resistance V by means of an adjustable variable resistance, Y.

The electric regulator or controller, consisting of the variable resistance V might be placed in a branch to the meter or other electro-thermo-dynamic device, instead of in direct circuit therewith. This modification is clearly indicated by the diagram, Fig. 9, in which the resistance R is contained in a branch to both the other devices. Such resistance R might, however, be in the same branch with the regulator V, as indicated in Fig. 10. It is obvious that the regulator or variable resistance V will act, as before, to determine the amount of current flowing in the coils H or H' on a variation of temperature, and will serve to keep the registry of the meter itself constant for a given flow of current on the circuit from $a$ to $b$ whatever the external temperature.

Instead of the electric regulator or compensator shown in Fig. 8, I might use the equivalent electric regulator indicated in Fig. 11, in which the lever L or other movable support operated by the thermo-dynamic device adjusts the position of an electric switch consisting of a series of contacts connected in regular order to a coil, H, or heating-conductor that is placed externally to the bulb, instead of within the same. Here the regulation would be produced by determining the amount of heating-conductor that shall operate upon the bulb. In this instance it might be advisable to include in the circuit with the coils H a variable resistance, (indicated at V',) which should increase in amount as the number of coils decreased, so as to keep the current in the meter branch constant despite the variations in electrical conductor H in circuit.

It is not by any means necessary that the electric regulator or controller should determine the flow of current to the electro-thermo-dynamic device by being included in the circuit therewith, since the electric thermic meter or other electro-thermo device might be placed in the secondary circuit of an induction-coil and the regulator connected with the primary thereof after the manner indicated in Fig. 12. In this instance the regulator is composed of a variable resistance and shunts current variably from the primary of the induction-coil. When the lever L of the thermo-dynamic actuator moves in response to an increase of external temperature, the regulator V shunts current in increased amount from the primary, and the flow of current on the secondary containing the meter is therefore diminished. In this application of my invention the currents supposed to be supplying the lamps and the induction-coil in circuit therewith is an alternating current, as indicated by the reversed arrows.

What I claim as my invention is—

1. The combination, with an electro-thermo-dynamic device, of a thermo-dynamic actuator or controller responsive to variations of temperature of the surrounding atmosphere and an electric regulator or controller adjustable thereby for governing the flow of current to the electro-thermo dynamic device.

2. The combination, with an electro-thermo-dynamic device, of a variable or adjustable resistance for governing the flow of current to the same and a thermo-dynamic actuator or adjuster responsive to variations of external temperature and operating upon said variable resistance, as and for the purpose described.

3. The combination, with an electro-thermo responsive device, of a variable resistance connected to the circuit of the same and a thermo-dynamic actuator or adjuster for said variable resistance.

4. The combination, with an electro-thermic meter, of an adjustable current-regulator governing the flow of current to said meter and a thermo-dynamic actuator or adjuster for said regulator, as and for the purpose described.

5. The combination, with a chamber having a diaphragm or wall expansible or movable under the variations of internal pressure due to variations of temperature, of an adjustable or variable resistance governed by said wall or diaphragm.

Signed at Lynn, in the county of Essex and State of Massachusetts, this 22d day of December, A. D. 1887

ELIHU THOMSON.

Witnesses:
WALTER C. FISH,
OTIS K. STUART.